UNITED STATES PATENT OFFICE.

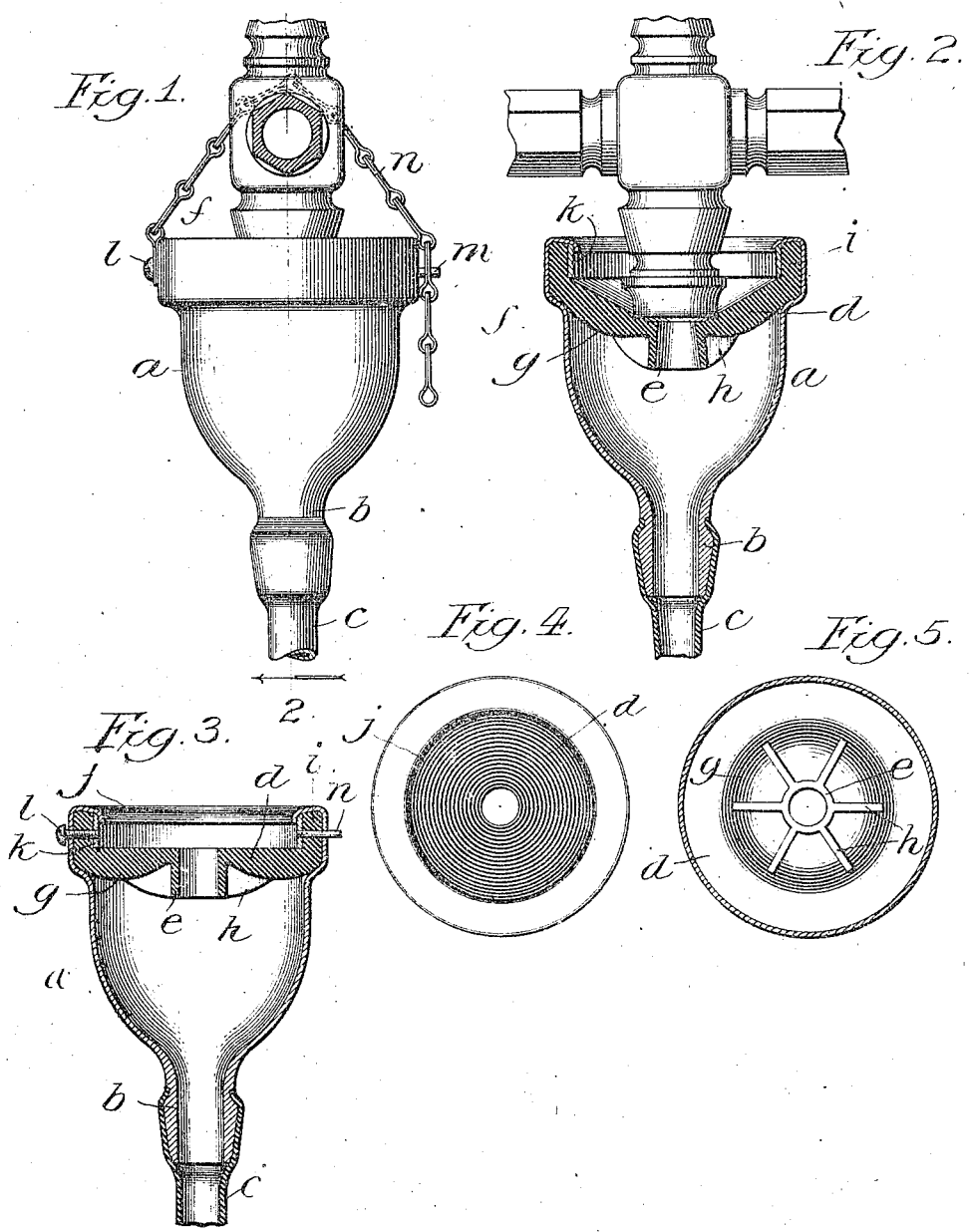

BURTON D. KNICKERBOCKER, OF CHICAGO, ILLINOIS.

HOSE CONNECTION FOR FAUCETS.

975,873.

Specification of Letters Patent.  Patented Nov. 15, 1910.

Application filed August 9, 1909. Serial No. 512,007.

*To all whom it may concern:*

Be it known that I, BURTON D. KNICKERBOCKER, a citizen of the United States, residing at Chicago, in the county of Cook and State of Illinois, have invented certain new and useful Improvements in Hose Connections for Faucets, of which the following is a description, reference being had to the accompanying drawings, forming a part of this specification, in which corresponding letters of reference in the different figures indicate like parts.

The object of my invention is to provide a detachable connection for the purpose of connecting a hose or similar fluid conduit to a faucet for use with bath-tubs, lavatories, lawn-sprinklers and the like, which shall be so constructed as to enable a fluid-tight joint to be made with faucets or other fixtures having outlets of varying shapes and dimensions, preferably by causing the end of the faucet or other fluid eduction element to connect closely with and embed itself into the surface of an elastic connecting element around one or more openings therein, in direct communication with the hose or conduit with which said element is, in turn, connected. I accomplish said object by means of a flexible diaphragm made from soft india rubber or similar elastic material, preferably in disk form and having a diameter considerably greater than that of the faucet to which it is to be applied; said diaphragm having one or more perforations at or near its center and so constructed, either by means of a metallic casing or otherwise, as to enable the perforation therein to communicate directly with the hose; the diaphragm being peripherally supported by means of a rigid case or ring and provided with means for detachably locking said rigid portion to the faucet, all of which is hereinafter more particularly described and claimed.

In the drawings Figure 1, is a front view of my improved connection showing a portion of a hose, a faucet and means for connecting the two, Fig. 2, is a central, vertical sectional view of the connection, showing it applied to a faucet, Fig. 3, is a like view of the connection without the faucet, Fig. 4, shows a plan view, and Fig. 5, is a bottom view of the diaphragm.

Referring to the drawings, $a$ represents a funnel-like case, the body of which is preferably formed from metal. The lower end of the case is provided with an outlet $b$, of smaller diameter, to which may be attached a flexible hose $c$. Into the upper end of the casing is secured a yielding contact element or diaphragm $d$, of soft india-rubber or other flexible elastic material having a central opening $e$, Figs. 2 and 3, to permit the passage of fluid directly to the hose $c$. The diameter of said opening, if there be but one, is made somewhat less than that of the smallest faucet to which it is likely to be applied, so that in case the faucet $f$ is caused to project therein, as may sometimes occur, the aperture will stretch so as to fit tightly around the outside of the faucet and form a water-tight joint. For this purpose, I prefer to thicken the body of the diaphragm, as shown at $g$, so as to form an annular ridge upon its under side around the opening and I also prefer to mold radial reinforcing bosses $h$, Figs. 2 and 5, upon the inner face of the diaphragm to prevent it from being reversed or rolled back upon itself under strong water pressure and thereby causing a leak when applied to faucets small enough to enter the opening. The diaphragm is provided with a peripheral bead $i$, and may be secured in place in the casing by means of an inturned peripheral flange $j$, which is spun or otherwise pressed against a thin ring $k$, interposed between it and the bead. The bead being compressed by the metal, serves to form a liquid-tight joint. A screw or rivet $l$, is passed through the casing and ring, while a pin $m$, is secured to said casing and ring in like manner at a point diametrically opposite to the rivet $l$. A chain $n$, has one end permanently attached to the part $l$ and is adapted to be passed over the top of the faucet when the pin $m$, may be extended through one of the links to hold the connection rigidly in place.

The operation of said device is as follows: The diaphragm is first placed against the end of the faucet with the opening in the latter opposite to that of the aperture $e$. Ordinarily, the faucet opening will be large enough to surround the aperture. The casing is then forced upwardly until the diaphragm is stretched, as shown in Fig. 2, thereby causing the end of the faucet to indent itself sufficiently into the rubber to form a water-tight joint. While thus held, the chain $n$, is drawn over the top of the faucet and fastened in the manner described so as to hold the diaphragm in its stretched condition. It is obvious that in order to accomplish this result there must be some kind of rigid peripheral frame. I prefer to employ the casing a, for this purpose, but do not wish to be confined thereto.

The means for connecting the device to the faucet need not be non-yielding, provided it is strong enough to overcome the water pressure.

My improved device is applicable to faucets of varying diameter, from those small enough to enter the central opening, to those whose diameter is nearly equal to that of the diaphragm.

Having thus described my invention, I claim:

1. A coupling connection of the class described, in which are combined a funnel-shaped metallic casing having a shoulder near its top to form a peripheral support for a yielding diaphragm, a yielding diaphragm provided with an upwardly extended annular peripheral portion, said diaphragm having a central opening, and a metallic ring within said annular portion, said diaphragm and ring being held in place by means of an inwardly and downwardly turned annular flange arranged to engage the upper edge of said metallic ring.

2. A coupling connection of the class described, in which are combined a funnel-shaped metallic casing flared outwardly near its top to form an internal shoulder, thence extended upwardly, inwardly and downwardly to form an annular recess, a metallic ring within and held in place by said downwardly extended portion, a yielding diaphragm arranged to rest upon said shoulder with an annular portion extended upwardly within said recess, said diaphragm having a central opening, and means for holding said diaphragm in a stretched condition against a faucet.

3. A coupling connection of the class described, in which are combined a funnel-shaped metallic casing flared outwardly near its top to form an internal shoulder, thence extending upwardly, inwardly and downwardly to form an annular recess, a metallic ring within and held in place by said downwardly extended portion, a yielding diaphragm arranged to rest upon said shoulder with an annular portion extended upwardly within said recess, said diaphragm having a central opening, a tubular portion extended downwardly therefrom with radial reinforcing ribs upon the under face of said diaphragm, and means for holding said diaphragm in a stretched condition against a faucet, substantially as shown and described.

4. In a coupling connection of the class described, the combination of a funnel-shaped casing having therein a centrally perforated elastic diaphragm to be pressed against the outer end of a faucet of larger diameter than that of the perforation in said diaphragm, said casing being flared outwardly near its top to form an inturned shoulder, thence extended upwardly, inwardly and downwardly to provide an annular recess for the reception of an annular flange upon said diaphragm, an annular peripheral flange upon said diaphragm, rigid means pressed against the inner face of said flange to hold the periphery of said diaphragm in place against an inward pull and an adjustable securing chain for holding said diaphragm under tension against the end of a faucet to cause the rim of the latter to be embedded therein.

In testimony whereof, I have signed this specification in the presence of two subscribing witnesses, this seventh day of August 1909.

BURTON D. KNICKERBOCKER.

Witnesses:
D. H. FLETCHER,
P. L. ANDERSON.